Oct. 13, 1953  J. C. NAYLOR ET AL  2,654,998
PUMP AND DOUBLE-ACTING MOTOR HYDRAULIC SYSTEM, INCLUDING
CONTROL VALVE MECHANISM
Filed July 12, 1952  7 Sheets-Sheet 1

INVENTORS
JOSHUA CHALLINER NAYLOR AND
JOHN NELSON FIELDHOUSE
BY Haseltine, Lake + Co.
AGENTS.

INVENTORS
JOSHUA CHALLINER NAYLOR AND
JOHN NELSON FIELDHOUSE
BY Haseltine, Lake & Co.
AGENTS.

Oct. 13, 1953 J. C. NAYLOR ET AL 2,654,998
PUMP AND DOUBLE-ACTING MOTOR HYDRAULIC SYSTEM, INCLUDING
CONTROL VALVE MECHANISM
Filed July 12, 1952 7 Sheets-Sheet 6

Fig. 9.

INVENTORS
JOSHUA CHALLINER NAYLOR AND
JOHN NELSON FIELDHOUSE
BY Haseltine, Lake & Co.
AGENTS

INVENTORS
JOSHUA CHALLINER NAYLOR AND
JOHN NELSON FIELDHOUSE
BY Haseltine, Lake & Co. AGENTS Patented Oct. 13, 1953

2,654,998

UNITED STATES PATENT OFFICE 2,654,998

PUMP AND DOUBLE-ACTING MOTOR HYDRAULIC SYSTEM, INCLUDING CONTROL VALVE MECHANISM

Joshua Challiner Naylor and John Nelson Fieldhouse, London, England, assignors to Vickers-Armstrongs Limited, London, England, a British company Application July 12, 1952, Serial No. 298,646
In Great Britain August 24, 1951

5 Claims. (Cl. 60—52)

1

This invention relates to a hydraulic control system for a bulldozer and the like in which there is provided hydraulic fluid pressure actuated driver means, manually controlled valve means and fluid pressure generating means, to establish selectively a combination of connections between the fluid pressure actuated driver means, the fluid pressure generating means and/or an oil reservoir as required, for raising, maintaining raised, lowering or floating a load such as, e. g. the blade of a bulldozer.

According to the present invention the hydraulic control system is characterised by the provision of means responding to the fluid pressure conditions in various parts of the system obtaining as the result of the various settings of the valve means, which, according to the setting of the valve means serve to automatically connect the driver to or isolates it from discharge of hydraulic fluid and so responds to fluid pressure in the pump circuit during actuation of the driver means as to maintain the discharge from the driver means at the correct proportionate rate to the rate of pressure feed from the pump to maintain a completely full hydraulic system.

Further in accordance with the present invention means for controlling the raising, lowering, maintaining raised and floating conditions of a bulldozer blade or other load to be controlled hydraulically under similar conditions, comprises a hydraulically actuated driver connected to the load to raise and lower the load, a pump to feed hydraulic pressure fluid to said driver, a discharge outlet from the driver, a main valve controllable manually to load "raise," "lower," "hold" and "float" settings for controlling the connection of the pump to said driver, means to close said discharge outlet yieldingly opposing but actuated by the load raising and lowering driver-operative hydraulic pressure from the pump to connect said driver to said discharge outlet when the said main valve is actuated to the "raise" and "lower" settings and thereupon to connect the pump operatively to the driver so that the discharge from said driver must be proportional to the rate of pressure feed from the pump to said driver.

The hydraulic circuit of the present invention can be regarded as incorporating a valve of the spool type set in selected position by a manually controlled lever or other suitable remote control means to control the connection of a pump feeding the hydraulic fluid under pressure to the jack or jacks or equivalent means for raising and lowering the blade or load and also for circulating the oil idly while the loaded jack or the like is held in selected position, the circuit including also a counter-balance valve normally held in the closed position to retain oil in the appropriate part of the hydraulic circuit without pump pressure so as to block such part of the circuit, cushioning means, e. g. a spring, maintaining the valve in this normal position, the influence of this cushioning means being overcome by pressure derived from the pump discharge during the operation of raising or lowering the blade or other load before discharge from the jack cylinder or cylinders or the equivalent thereof can take place, so that the discharge from the said cylinder or cylinders must be proportional to the rate of pressure feed from the pump to the jack cylinder or cylinders, and also there being provided between the aforesaid counter-balance valve and a branch from the pressure line from the pump to the jack cylinder or cylinders a counter-balance control valve which adapts itself automatically to the appropriate position in conformity with the line being served by the pump, whereby the pressure in the pump circuit cannot be applied to the first mentioned counter-balance valve to open the discharge from the jack cylinder or cylinders until the second mentioned counter-balance control valve is opened.

In order that the invention may be clearly understood and readily carried into effect drawings are appended hereto illustrating an embodiment thereof, and wherein.

Figures 8, 15:
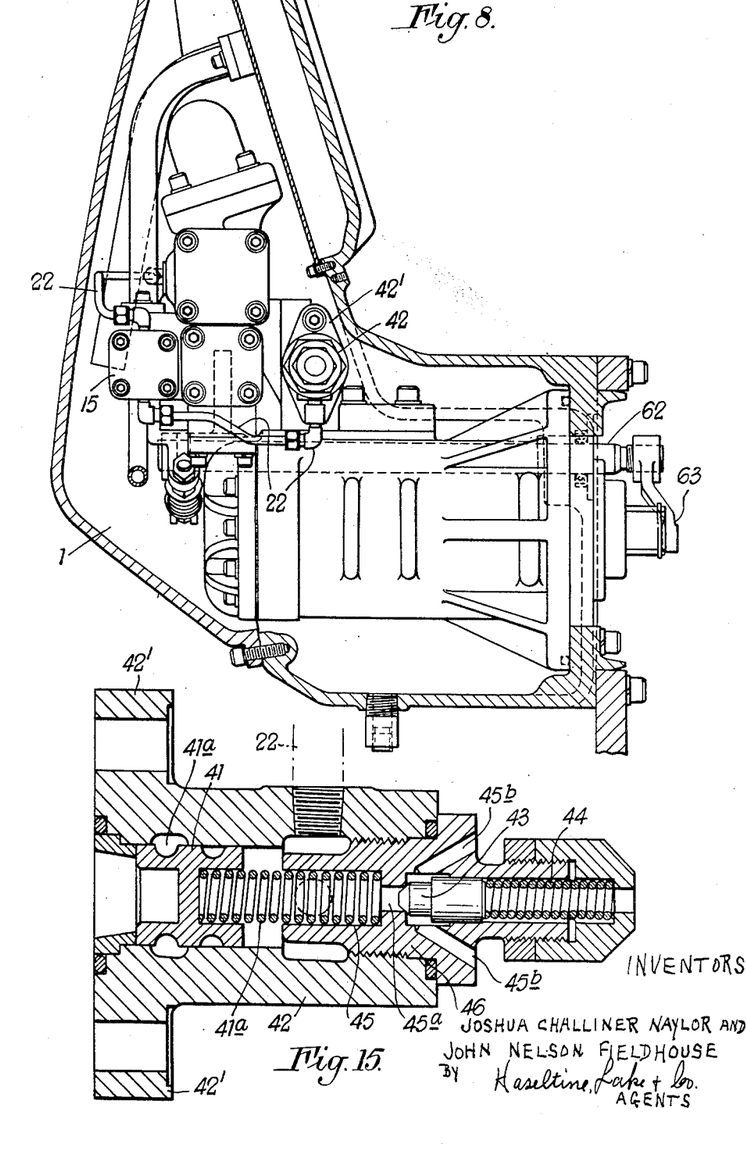
Figure 8 is a side elevation of the valve gear and oil reservoir with a cooler, the reservoir and cooler being in section.
Figure 15 is a sectional front elevation showing details of an overload valve.

Referring to the drawings, the pumping means and valve gear for supplying fluid controlling the hydraulic fluid pressure required to actuate a jack or pair of jacks connected to the blade of a bulldozer, are accommodated within an oil reservoir 1 sealed against ingress of foreign matter, the hydraulic circuit being fed from any suitable form of such pumping means which preferably is, as shown, a radial blade type pump 2 having a discharge conduit 3 to the main control valve 4 which is of the manually operated push-pull spool type having a spool 5 slidably supported within a bore 6 of a valve housing 7 and prolonged beyond this bore to form a stem 8 about which is disposed a coiled compression spring 9 operating against opposed abutments 10 and 11 on the stem to maintain the valve in the normal position so that it can be loaded in either direction of operation of the valve spool from the normal position and thereby assisting the return of the valve spool to the normal position. The spool 5 is operated by a crank 61 (see Figure 9) on a shaft 62 journalled in bearings with suitable oil seals passed through the sides of the reservoir 1 and carrying at one exposed end a crank 63 (see Figure 8) by which the shaft is connected to a control handle. The crank 61 is connected to the spool 5 by a pair of links 64 and the spool is normally retained in the "hold" position as shown in Figure 10 by the spool centering spring 9. The operations of "lower" and "raise" are accomplished by the operator moving the valve spool in the appropriate direction against the action of the centering spring which returns the spool when the control handle is released. To obtain the condition known as "float" which follows "lower" the operator moves the valve spool further against the additional resistance of spring 67 acting against the detent lever 64b through roller 63 carried in forked lever 65 pivoted at 66. The roller engages the detent and holds the valve spool in this position until forcibly released.

Figure 13:
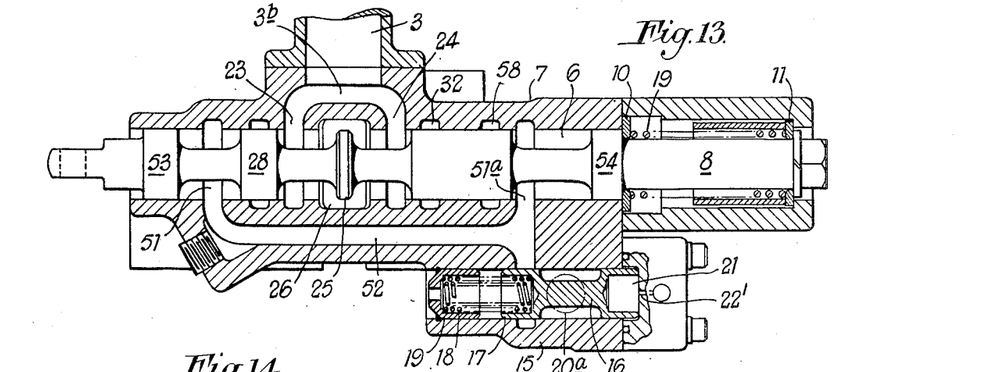
Figure 13 is a section on the line XIII—XIII of Figure 10.

A jack is indicated diagrammatically by the reference numeral 12, the load due to the weight of the bulldozer blade (not shown) being in the direction of the arrow W. Discharge of oil from the jack cylinder 13 due to the displacement of the piston 14 is finally via a counter-balance valve 15 which normally is spring loaded to the position which cuts off the escape of oil to the reservoir so that the oil in the appropriate part of the circuit is blocked under substantially no pressure. This counter-balance valve 15 is embodied in the main valve housing as shown in Figure 13. In the diagrammatic Figures 1 to 7 this valve 15 is shown, purely for simplifying the diagrams, the reverse way to the actual arrangement shown in Figure 13.

The counter-balance valve 15 can be spring loaded to the position which cuts off the return of the oil to the reservoir by constructing the valve as of the substantially balanced sliding piston type, i. e. with a valve stem 16 having a recessed head 17 at one end in which is engaged a coiled compression spring 18 also engaged in a fixed cup or abutment member 19 coaxial with the valve, the said recessed head 17 forming a part which closes a port 20 in the housing of the counter-balance valve 15 through which the oil escapes via outlet 20a to the reservoir. The valve stem at its end removed from the said recessed head is formed with another cylindrical recessed head 21 which is exposed at its outer end to fluid pressure from a conduit 22, so that the free escape of oil to the reservoir is controlled by the fluid pressure fed through the conduit 22 and applied to the counter-balance valve 15.

Two ports 23 and 24 are provided in the main valve housing 7 disposed opposite sides of a central land 25 of the spool, both of these ports communicating via a median enlargement 26 of the bore of the valve housing with a discharge port 27 communicating directly with the reservoir. That is to say the supply line 3 from the pump is, within the valve housing, branched as at 3b into two passages communicating with the two ports 23 and 24 through which the oil under pressure flows through the valve housing 7 into the appropriate parts of the circuit. Two further lands 28 and 29 are provided on the valve spool 5 equidistantly spaced from the said central land 25, the land 28 serving at the appropriate stage to close a port 30 in the valve housing and comprising one end of a passage 31 in the valve housing 7 feeding a conduit 31a flared out as at 31b (see Figure 10) for connection by a conduit 31c to one end of the jack cylinder 13, and the other land 29 being greater in axial dimension and closing a port 32 for a passage 33 communicating with the other end of the jack cylinder via a piston type check valve member 50 having a spherical head pressed by a spring 57 against a seating ring 56 serving as a port 55, a flared passage 49 symmetrical with respect to the flared passage 31b and thence by a conduit 49a to the jack cylinder, the passage 49 being extended inwards as at 49b to a port 58 in the main valve, the check valve 50 serving to close the port 55, the bore 57a accommodating the spring 57 being open to the passage 49 behind the spherical head of the valve 50. As will be apparent, the latter mentioned end of the jack cylinder is that which receives the fluid pressure appropriate to raising the blade of the bulldozer or equivalent load, it being preferred to carry the piston rod 14' of the jack through the other end of the cylinder so that the maximum volume space obtaining in the jack cylinder is that which receives the fluid pressure when the bulldozer blade is fully raised.

End lands 53 and 54 are formed on the main valve spool 5, and communication between the port 30 and the control valve 15 is effected via an end port 51 in the bore 6 and a passage 52 leading from this port 51 to the port 20 of control valve 15 and also to a port 51a at the other end of the bore 6.

Figure 14:
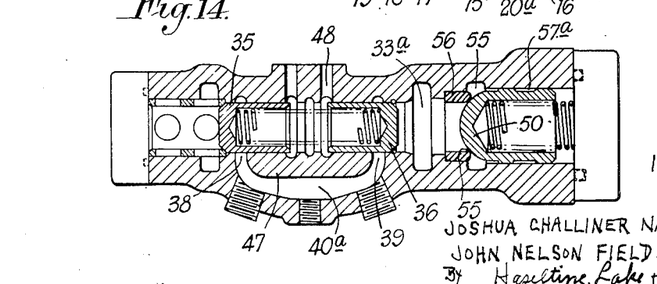
Figure 14 is a section on the line XIV—XIV of Figure 10.

In the housing 7 parallel with and spaced from the bore 6 containing the main valve spool 5 is a cylindrical bore 34 (see Figure 10), ports 38 and 39 communicating with this bore, the bore containing a counter-balance control valve or shuttle valve member taking the form of two coaxial opposed hollow piston-like valve members 35 and 36 closed at their outer ends and accommodating a coiled compression spring 37 tending to urge them apart, this coiled compression spring when extended to the prescribed limit maintaining the two cylindrical valve members 35 and 36 apart to close the two fluid pressure ports 38 and 39. Thus, the bore 34 and shuttle valve member therein can be regarded as comprising the counter-balance control valve. It will be noted that this latter mentioned valve is a shuttle valve and is referred to as the counter-balance "control"

valve as distinct from merely the counter-balance valve 15. A further port 33a is provided in the bore 34 to connect at the appropriate time the passage 33 with the port 39 and conduit 22. The ports 38 and 39 branch as at 40a (see Figure 14) into a common passage 40 leading to the conduit 22, the end of which communicating with one end of the housing of the aforesaid counter-balance valve 15 is restricted as at 22', the other end of this conduit 22 communicating also by a restriction 22b with one side of a spring loaded piston element 41 of an overload valve 42, the housing of which (see Figures 9 and 15) is secured at one end by lugs 42' to the main valve housing, and in this end of the housing 42 the conduit 3 between outlet of pump and main valve bore 6 communicates with the other side of the piston element 41 which normally closes an escape port 41a and by reason of it being exposed to direct pressure from the pump serving to relieve excessive load in the conduit 3 should this occur during the "hold" stage, this communication being indicated diagrammatically in Figures 1 to 7 at 3' as a branch taken off the conduit 3 from the pump serving the main valve. This overload valve contains a conical maximum pressure control valve member 43 adapted to be opened when the fluid pressure in the said conduit 22 reaches a predetermined maximum pressure, e. g. one thousand pounds per square inch, a coiled compression spring 44 normally maintaining this maximum pressure control valve member seated against the reduced diameter end 45a of a bore 45 in an axial valve element 46 screwed into the valve housing 42, the bore 45 partly accommodating a spring 41a loading the valve element 41, oil escaping through bores 45b when the relief valve member 43 is raised from its seating. The aforesaid restriction 22b fitted in the connection from conduit 22 allows the overload valve member 41 to open after the maximum pressure valve, to relieve the pump, in known manner.

A restricted passage 47 connects to a pair of vent ports 48 the junction of the two passages 38 and 39 of the counter-balance control valve containing the counter-balance control valve members 35 and 36 so that when the counter-balance control valve is in its normal condition, i. e. with its two slidable cylindrical members 35 and 36 held apart by the interposed spring 37, the said conduit is vented to the reservoir via restricted passage 47, median part of bore 34 and ports 48 to ensure that valve element 41 can act freely as a low pressure relief for the pump whilst by-passing, the vent being closed when valve elements 35 or 36 shuttle.

Any tendency for there to be a deficiency of oil in the complete circuit is taken care of by providing in the passage 52 which returns the oil from the jack to the reservoir via the counter-balance valve 15 a replenishing valve such as e. g. a ball valve 60 which is normally maintained on its seating by the return pressure in the circuit but which will be raised to admit the appropriate amount of oil to replenish the circuit should there be a deficiency of oil in the circuit.

To explain the operation of the valve mechanism, reference will now be made to the diagrams of Figures 1 to 7. In the "hold" position of the main valve spool 5, as shown in Figure 1, the part 17 of the counter-balance valve 15 by the action of the spring 18 is held in the position which cuts off the escape of oil to the reservoir via the port 20a so that the oil in the passage 52 of the main valve is blocked under substantially no pressure.

It will be seen that in this "hold" position of the main valve spool, the ports 23 and 24 are open to the enlargement 26 (see Figure 10) and the outlet 27, so that when the jack is held immovable the pump 2 freely circulates the oil back into the reservoir via the two ports 23 and 24, the flow of oil to the jack from the main valve being prevented by the two lands 28 and 29 on the main valve spool, the land 28 closing the port 30 communicating via passage 31 and conduit 31c leading to one end of the jack cylinder 13, and the other land 29 closing the port 32 for the passage 33 communicating with the other end of the jack cylinder via the check valve member 50. Consequently the oil in the jack cylinder at the side remote from the piston rod 14' will, under the influence of the weight of the bulldozer blade, be blocked under pressure in the cylinder, conduits 49a, the passages 49 and 49b up to the closed port 58 in the main valve. The oil in the conduit 31c and passage 30 between the jack piston 14 and land 28 of the main valve spool, and also the oil in the passage 52 between land 28 and the counter-balance valve 15 and replenishing valve 60 is blocked under no pressure.

Figures 1, 2:
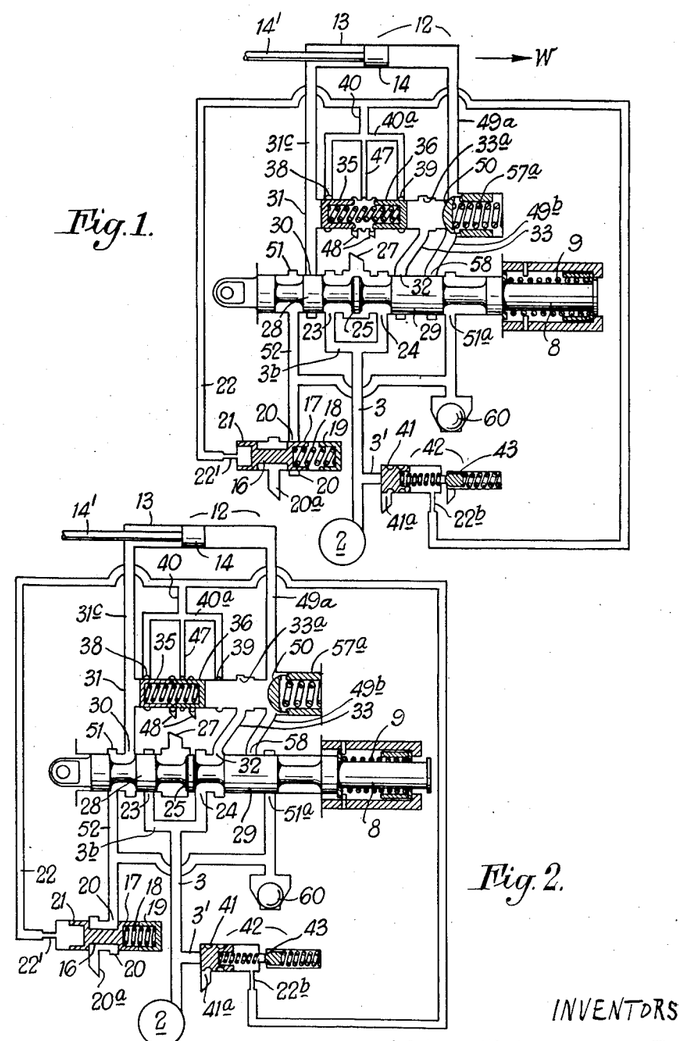
Figures 1 to 7 are diagrammatic views all showing the same circuit appropriate to the valve and showing respectively the relative positions of the parts of the valve mechanism at the following stages of the position and actuation of the bulldozer: "hold," "raise," "lower," "float down," "float up," "approaching lower" and "approaching raise."

In moving the main valve spool 5 in the direction to open the port 32, i. e. to the right from that shown in Figure 1 to reach the "raise" position shown in Figure 2, the port 32 is opened by the displacement of land 29 to establish communication with the end of the jack cylinder 13, i. e. the right hand end in the diagrams, which will drive the jack in the direction of the arrow shown in Figure 2 to raise the bulldozer blade (i. e. to the left looking at Figure 2).

Figure 7:
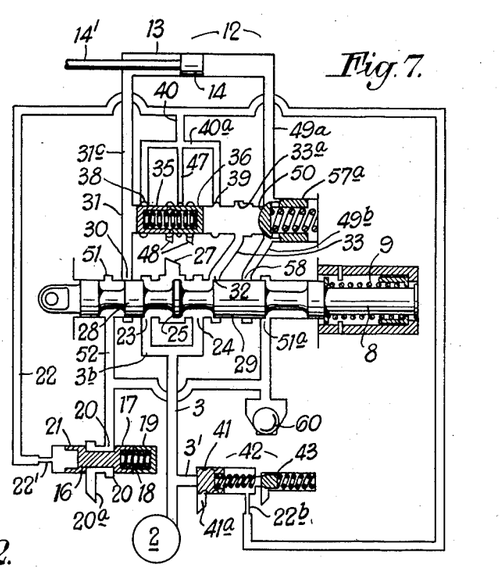

Before communication is established the valve mechanism passes through the condition shown in Figure 7 where part of the pump delivery enters passage 33 to move counter-balance control elements 36 against the other element so as to close off the restricted passage 47 from the outlets 48 and open port 39 and via passage 40 and line 22, connect the pump pressure to the restricted inlet 22 of counter-balance valve 15 to overcome spring 18 thereof and open port 20 by the displacement of valve member 16, i. e. the head 17 of this valve member 16 uncovers the escape port 20 before the bypass passage 23 is closed. Pressure from conduit 22 also reaches the chamber 42b in the overload relief valve 42 so that the pump pressure can be raised above idling. As the bypass passage 23 closes, oil under pressure from the pump flows through port 33a against the check valve 50 overcoming the load thereon from the suspended bulldozer blade and flowing to the jack cylinder via opened port 55, passage 49, and conduit 49a. Fluid displaced from the left hand end of the jack cylinder (looking at Figure 2) returns to the tank from the jack cylinder via the passage 31 and ports 30 and 51 of the main valve housing and passage 52 by reason of the land 28 of the main valve spool 5 being moved away from the port 30 communicating with the appropriate end of the jack cylinder. It is important to note that the check valve member 50 is opened only when the pressure due to the operation of the pump is sufficient to raise the bulldozer blade. This check valve 50 consequently forms a positive seal during the hold position of the main valve shown in Figure 1 to prevent the blocked oil in the passage 49 under the pressure of the bulldozer blade or equivalent load from operating against the said counterbalance control valve member 36 or reaching the pump or bypass ports during movement of the main valve spool before the pump has built up sufficient pressure to overcome the load, the final blocking of this oil being due to the closure of the port 58 in the main control valve housing by the outer end of the land 29 of the main valve spool.

By means of the foregoing the pressure generated for lifting the bulldozer blade is only that required to actually lift the blade to the fully raised position, and pressure above this stage will be relieved by the aforesaid maximum pressure control valve member 43 with which the appropriate end of the aforesaid conduit 22 communicates via restriction 22a, it being understood that during the "raise" stage the relief valve member 41 is subjected to balanced pressure from the pump.

Figure 3:
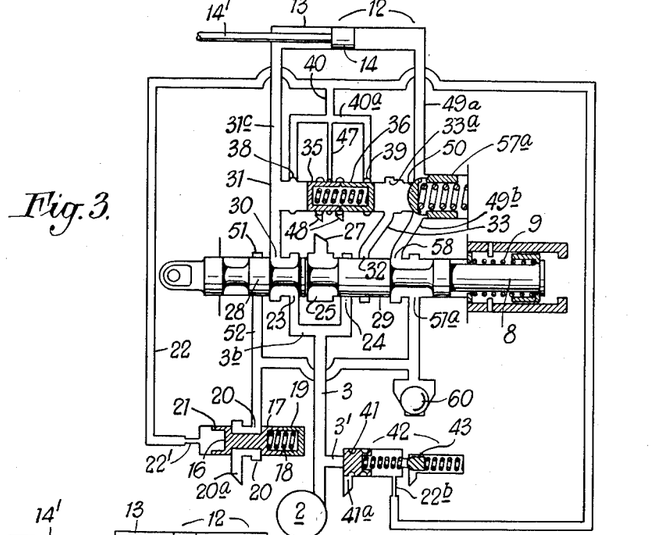
Figure 9:
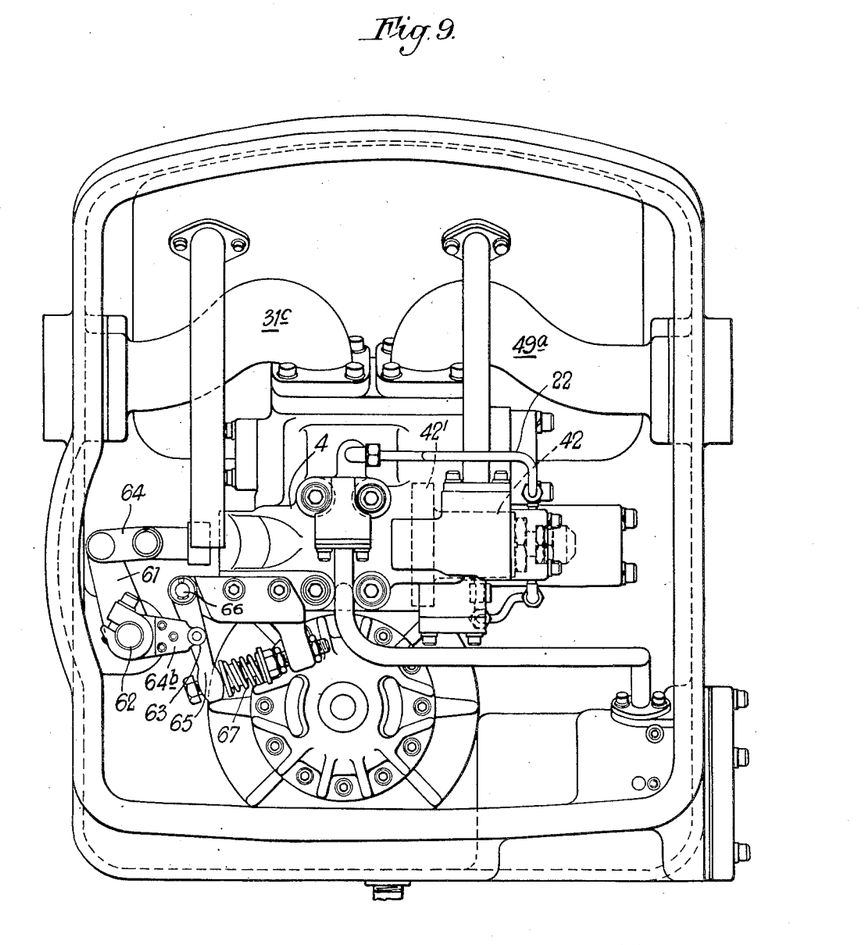
Figure 9 is a front elevation view of Figure 8 with a front section of the reservoir removed to show the valve mechanism.
Figure 10:
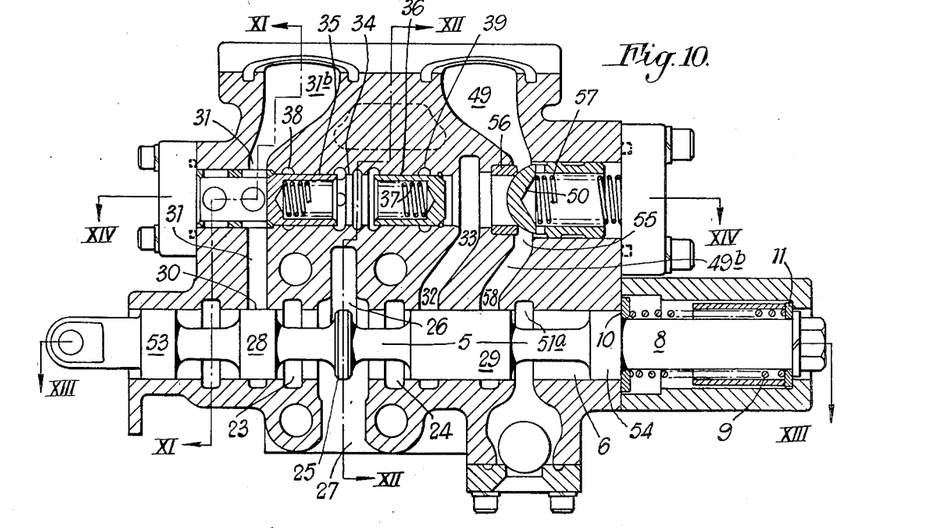
Figure 10 is a sectional front elevation of the main valve.
Figure 11:
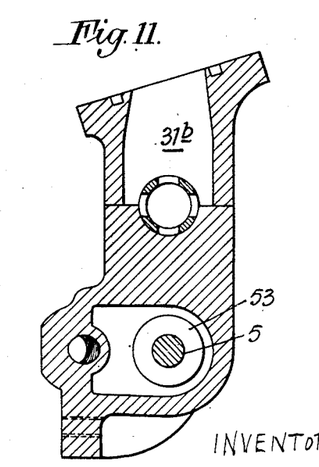
Figure 11 is a section on the line XI—XI of Figure 10.
Figure 12:
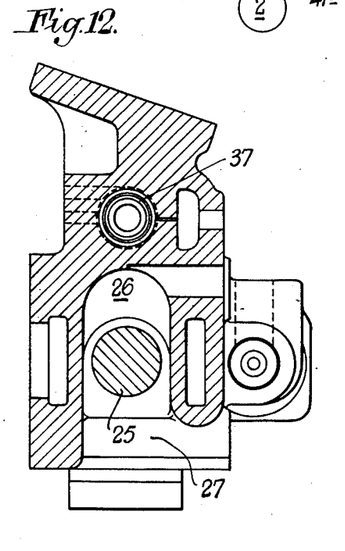
Figure 12 is a section on the line XII—XII of Figure 10.

When lowering the bulldozer blade pressure is applied to the appropriate end of the cylinder 13, i. e. the left hand end looking at the diagrams, moving the spool to the position shown in Figure 3, this movement being in the reverse direction to that in which it was moved to effect a raising of the bulldozer blade, i. e. by moving the crank 61 to the position marked "lower" in Figure 9, and this has the effect of shifting over the counter-balance control or shuttle valve members 35 and 36 to the opposite position to that shown in Figure 2 so that these members 35 and 36 occupy the position shown in Figure 3, this resulting from the change in the end of exposure of such valve members to the pressure from the pump, the pump pressure now passing through the port 30, passage 31 and conduit 31a to the appropriate end of the cylinder 13, the oil pressure in the passage 31 acting on the member 35 of the counter-balance control valve to effect the said shifting over of this valve and thereby opening port 38 and admitting oil pressure to the conduit 22 via the passage 40, so that the counter-balance valve 15 is again moved to the position it occupied during the "raise" stage. Arising from this the discharge port 29a of the counter-balance valve will discharge the oil from the right hand end of the jack cylinder 13 via the spring side of the said check valve 50, and port 55 of the counter-balance control valve, passage 49b, port 58 and 51a of the main valve and passage 52. The oil between the check valve member 50 and the counter-balance control valve member 36 is now trapped by reason of the larger axial dimension land 29 of the main valve spool closing the port 24 through which oil under pressure passes from the main valve when the valve spool is set in the position for raising the bulldozer blade. It is important to note that under these conditions it is only possible to discharge oil from the right hand end of cylinder 13 whilst pressure is maintained in the left hand end of the cylinder, thus ensuring that the discharge from the cylinder is proportional to the rate of feed from the pump, i. e. the rate of lowering the bulldozer blade is controlled by the pump thus maintaining the hydraulic system full of oil.

Figure 4:
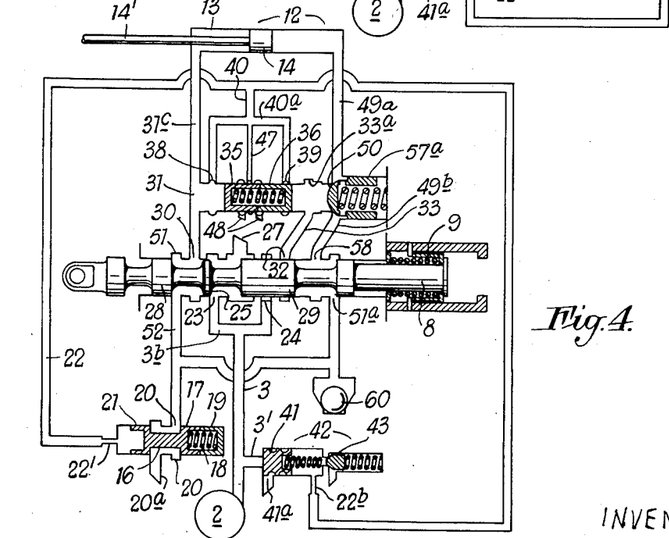
Figure 5:
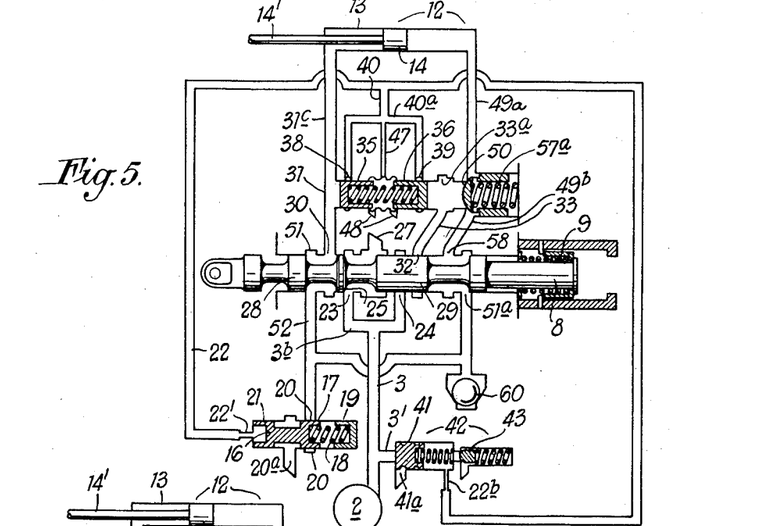
Figure 6:
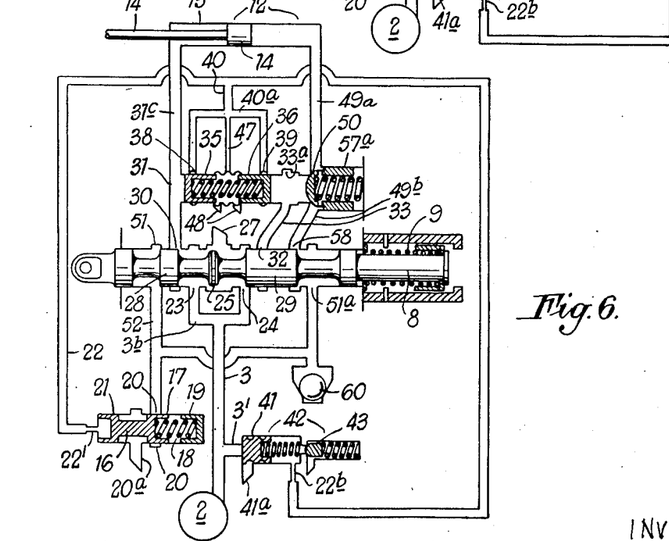

When the valve mechanism is to be set to the "float" position i. e. when the bulldozer blade is to be free to float downwards or upwards, the main valve spool 5 is moved still further to the left to the "float" position (see Figure 4) beyond the position in which it was moved for lowering the bulldozer blade, and this has the effect of establishing communication from the pump with the reservoir via passage 3, port 23 and the outlets 26, 27 at the median part of the main valve housing. The pump is thus by-passed, so that the pressure in the passage 3 to the outlet 27 is "by-pass" pressure. This has the effect of any oil under light pressure in the circuit passages 22 and 52 maintaining open the port 20a of the counter-balance valve 15 by which the oil returns to the reservoir, and also displacing under light pressure the counter-balance control or shuttle valve members 35 and 36 to the same position they occupy during lowering. The main valve spool 5 also occupies the same position as shown in Figure 4 when the bulldozer blade is floating in the upward direction (see Figure 5), the pump still circulating idly under by-pass pressure to the tank or reservoir through outlet 27. This latter float condition can be that which obtains when the bulldozer blade is trailing on the ground and the bulldozer is being moved, and as with the "float down" condition shown in Figure 4, both sides of the jack cylinder communicate with the counter-balance valve 15, but as there is now practically no pressure in the circuit the spring 37 reasserts itself to return the valve members 35 and 36 to the same position as that occurring during "hold" condition shown in Figure 1. There is now no pressure in the conduit 22 acting upon the valve member 21 of the counter-balance valve 15 consequently the port 20a of this latter valve is closed. The result is a closed cylinder circuit and any displacement of the jack piston will result in suction being created in the closed circuit and the lifting of the replenishing valve 60 to maintain the closed circuit completely charged.

On moving the main valve spool 5 towards the "lowering" position (see Figure 6), on its way to the full "lower" position the spool 5 will bring the land partly over the port 30 which will admit the oil under "by-pass" pressure to the left hand end of the jack cylinder, and also the land 29 will partly open the port 58 and thereby admit "suspended-load" pressure, i. e. the pressure due to the weight of the suspended bulldozer blade, as far as the counter-balance valve 15 via the rear of check valve 50, port 58 and passage 52.

Assuming that the maximum pressure control valve 43 is adapted to be opened at 1,000 lbs. per sq. inch, the overload relief valve 41 can be adapted to be opened at about fifty five lbs. per sq. inch and the counter-balance control valve members 35 and 36 opened at twenty to forty lbs. per sq. inch, with the check valve 50 opened at fifteen lbs. per sq. inch. With such an example the counter-balance valve 15 will be operated at from forty-two to seventy-four lbs. per sq. inch, whilst the replenishing valve 60 can be operated at 0.5 lb. per sq. inch.

We claim:

1. Means for controlling the raising, lowering, maintaining raised and floating conditions of a load to be controlled hydraulically, comprising a jack for raising and lowering the load, a main valve of the sliding spool type, manually controlled means to actuate said spool, a pump generating hydraulic fluid pressure to actuate the jack in the load raising and lowering directions, an oil reservoir accommodating the pump and said valve, said valve controlling a hydraulic circuit served by said pump and including connections to opposite ends of the jack from the pump via said main valve, and a connection to a return or discharge outlet to the reservoir from the ends of the jack via said valve, a counter-balance valve controlling said return or discharge outlet and being actuated by load-operative fluid pressure during actuation of the jack to open said outlet and by means yieldably opposing said pressure to close said outlet when the main valve spool is set to isolate the pump from the jack, a shuttle valve exposed to the said connections to opposite ends of the jack and which adapts itself positionally automatically in conformity with the selected one of said connections being served by the pump, connections from said shuttle valve to said counter-balance valve by which the pressure in the pump circuit can be applied to and isolated from the said counter-balance valve so that said counter-balance valve will not open the connection from the appropriate end of the jack cylinder to said discharge outlet until the said shuttle valve is actuated by pump pressure to introduce a control of said discharge opening which is dependent upon and maintained by the fluid pressure in the said connections to the jack so that the discharge from the jack cylinder must be proportional to the rate of pressure feed from the pump to the jack cylinder, and a check valve in the connection which serves the load raising side or end of the jack and serving to isolate the shuttle valve from the oil under pressure between said latter side or end of the jack and the main valve when the main valve spool is set otherwise than in the position at which the load is being raised by the jack.

2. Means for controlling the raising, lowering, maintaining raised and floating conditions of a load to be controlled hydraulically according to claim 1, wherein the said counter-balance valve is held normally in the closed position by spring means to retain oil in the appropriate part of the hydraulic circuit without pump pressure so as to block such part of the circuit, the influence of said spring means being overcome by pressure derived from the pump discharge during the operation of raising or lowering the load before discharge from the jack cylinder can take place, and the said shuttle valve is a counter-balance valve control located in the hydraulic circuit between the aforesaid counter-balance valve and a branch from the pressure line from the pump to the jack cylinder, said shuttle valve having opposed coaxial slidable valve elements controlling individually distinctive branch passages connecting the fluid pressure lines serving opposite ends of the jack cylinder distinctively to a common pressure passage to said counter-balance valve, the hydraulic pressure in said common pressure passage opening the discharge from the jack cylinder.

3. Means for controlling the raising, lowering, maintaining raised and floating conditions of a load to be controlled hydraulically according to claim 2, wherein said counter-balance control valve has one of its said slidable valve elements exposed for operation to the hydraulic fluid pressure in said connection leading to one end of the jack from the pump discharge and at a position between the said main valve and the said end of the jack, and has its other slidable valve element along with said check valve exposed to the hydraulic fluid pressure in said connection leading from the pump to the other end of the jack and at a position between the main valve and said latter end of the jack cylinder, said counter-balance control valve elements under the influence of jack operating pump pressure opening ports both communicating with a discharge port of said counter-balance valve, the main valve having a pair of end discharge ports communicating with said discharge port of said counter-balance valve and a further pair of ports both communicating with the pressure line from the pump, and a by-pass port between said latter pair of ports, the valve spool having a pair of axially spaced lands adapted to close simultaneously and to open selectively a further pair of ports serving the distinctive pump pressure line connections from the main valve to the ends of the jack and in the position closing both of said latter line connections and opening said by-pass port for idle oil circulation by the pump, a further port in the main valve opened and closed by one of said lands by which is maintained and released the blocking under the influence of the weight of the load on the oil in one end of the jack cylinder, said latter mentioned port communicating with said one end of the jack cylinder and the said latter land controlling the connection of the one end of the jack cylinder to one of the said end discharge ports, the other of said two lands controlling the connection of the other end of the jack cylinder to the other of said end discharge ports, a third land being formed on the main valve spool between the aforesaid lands to isolate the main valve port serving the latter end of the jack cylinder from the pump when the said by-pass port is exposed for said idle oil circulation by the pump.

4. Means for controlling the raising, lowering, maintaining raised and floating conditions of a load to be controlled hydraulically according to claim 2, wherein the connections from the said main control valve to the discharge port of said counter-balance valve also communicate with a replenishing valve.

5. Means for controlling the raising, lowering, maintaining raised and floating conditions of a load to be controlled hydraulically according to claim 3, wherein the connections from the said main control valve to the discharge port of said counter-balance valve also communicate with a replenishing valve.

JOSHUA CHALLINER NAYLOR.
JOHN NELSON FIELDHOUSE.

References Cited in the file of this patent
UNITED STATES PATENTS

| Number | Name | Date |
|---|---|---|
| 2,451,013 | Ziskal et al. | Oct. 12, 1948 |
| 2,477,669 | Stephens | Aug. 2, 1949 |
| 2,608,824 | Kirkham | Sept. 2, 1952 |
| 2,611,246 | Ackerman | Sept. 23, 1952 |